United States Patent [19]

Morishita

[11] 4,282,547
[45] Aug. 4, 1981

[54] COLOR IMAGE PICK-UP APPARATUS

[75] Inventor: Masanobu Morishita, Tokyo, Japan

[73] Assignee: Nippon Electric Co., Ltd., Tokyo, Japan

[21] Appl. No.: 74,829

[22] Filed: Sep. 12, 1979

[30] Foreign Application Priority Data

Sep. 12, 1978 [JP] Japan .................................. 53/112770

[51] Int. Cl.³ ............................................... H04N 9/07
[52] U.S. Cl. ...................................................... 358/44
[58] Field of Search .......................... 358/41, 43, 44, 55

[56] References Cited

U.S. PATENT DOCUMENTS 3,719,771  3/1973  Eto et al. ............................ 358/55 X

OTHER PUBLICATIONS

Dillon et al., IEEE Transactions on Electron Devices, vol. ED-25, No. 2, Feb. 1978.
Barbe, Proceedings of the IEEE, vol. 63, No. 1, Jan. 1975.

Primary Examiner—Robert L. Richardson
Attorney, Agent, or Firm—Claude A. S. Hamrick

[57] ABSTRACT

Incident light is analyzed into a cyan light component, a yellow light component and a white light component covering spectrum characteristics of the cyan and yellow light components. The three light components are converted into electric signals by one or more image pick-up devices and the electric signals are separated into a cyan signal, a yellow signal and a white signal. A matrix circuit comprising color filters arranged in a predetermined pattern is provided for synthesizing the cyan, yellow and white signals into a luminance signal and two types of color difference signals.

9 Claims, 6 Drawing Figures

COLOR IMAGE PICK-UP APPARATUS

BACKGROUND OF THE INVENTION

This invention relates to a color image pick-up apparatus for obtaining color television signals using a separate luminance system.

In a prior art color image pick-up apparatus incorporated in a separate luminance system, an optical filter generally called a luminance filter (Y filter) was used in a luminance signal path to act as the color filter. Generally placed in the color signal path was a repetition of a red filter and a blue filter, or a repetition of a red filter, green filter, and blue filter. These systems are called a Y-RB system or a Y-RGB system. In the use of the color image pick-up apparatus of the type described above for the purpose of obtaining a luminance signal Y, the picked up signals are passed through a Y filter having a visual sensitivity characteristic resulting in light loss which occurs on the short wavelength side as well as on the long wavelength side. Moreover, as the picked up signals are passed through a red light transmitting filter, a green light transmitting filter, and a blue light transmitting filter for the purpose of obtaining R, G and B color signals, light components other than transmitted light are lost. Accordingly, the light utilization factor of the color image pick-up apparatus is low which is extremely disadvantageous from the standpoint of sensitivity. In order to improve the sensitivity, a method has been proposed wherein a cyan light filter and a yellow light filter are used as color filters in the color signal path. Usually, in this method, a red signal or a blue signal is modulated with a carrier wave frequency determined by the pitch of a repetitive filter arrangement which passes all visible light. Accordingly, the red signal and the blue signal exist in a higher frequency region of the image pick-up apparatus output signal. When demodulating respective color signals back to the image frequency band, noise in that higher frequency band is then converted into a lower frequency band. This, in turn, causes a degrading of the color signals signal-to-noise ratio. Also, it can be readily understood that as the frequency of the output of the image pick-up device (including a preamplifier) increases, the noise level also increases.

SUMMARY OF THE PRESENT INVENTION

The object of this invention is to provide a novel color image pick-up apparatus capable of producing a luminance signal and two types of color difference signals by using a matrix circuit comprising a combination of color filters.

Another object of this invention is to provide a novel color image pick-up apparatus having a high sensitivity characteristic.

Further object of this invention is to provide a novel color image pick-up apparatus capable of improving signal-to-noise ratio of color signals.

According to this invention, there is provided a color image pick-up apparatus comprising an analytical optical system for analyzing incident light into a cyan light component, a yellow light component, and a white light component covering spectrum characteristics of the cyan and yellow light components. The invention also consists of an image pick-up device for converting the three light components into electric signals and means for separating the image pick-up device output signals into a cyan signal, a yellow signal, and a white signal. The invention also provides a matrix circuit for synthesizing the cyan signal, the yellow signal, and the white signal into a luminance signal and two types of color difference signals.

IN THE DRAWING

DETAILED DESCRIPTION OF THE PREFERRED EMBODIMENTS

Before describing preferred embodiments of the invention, the principle of this invention will first be briefly discussed.

The invention belongs to a so-called W-Ye, Cy system wherein incident light is analyzed into a white light component (W), a yellow light component (Ye), and a cyan light component (Cy). Electric signals are produced by a photoelectric converting means designed by taking into consideration such factors as the color temperature of the illumination, and the spectrum characteristics of the image pick-up device lenses. The spectrum characteristics of the W filter, Ye filter and Cy filter are selected to satisfy the following equations:

$$W = rR + gG + bB \quad (1)$$
$$Ye = rR + gG$$
$$Cy = gG + bB$$

where r, g and b are the trichromatic coefficients, and R, G and B are the normalized illumination intensities of the red, green and blue primary colors.

Thus, the overall spectrum characteristics are selected such that ratios R:G and G:B among R, G, B respectively contained in components W, Ye and Cy, would be maintained at definite values. When the spectrum characteristics are selected in this manner, the luminance signal Y, and the color difference signals R-Y and B-Y are expressed by the following equations:

$$\begin{pmatrix} Y \\ R-Y \\ B-Y \end{pmatrix} = \begin{pmatrix} \frac{0.3}{r} - \frac{0.59}{g} + \frac{0.11}{b}, & \frac{0.59}{g} - \frac{0.11}{b}, & -\frac{0.3}{r} + \frac{0.59}{g} \\ \frac{0.7}{r} + \frac{0.59}{g} - \frac{0.11}{b}, & -\frac{0.59}{g} + \frac{0.11}{b}, & -\frac{0.7}{r} - \frac{0.59}{g} \\ -\frac{0.3}{r} + \frac{0.59}{g} + \frac{0.89}{b}, & -\frac{0.59}{g} - \frac{0.89}{b}, & \frac{0.3}{r} - \frac{0.59}{g} \end{pmatrix} \begin{pmatrix} W \\ Ye \\ Cy \end{pmatrix} \quad (2)$$

Accordingly, after separating three signals of W, Ye and Cy from the output of the image pick-up device and by passing the separated signals through a matrix circuit that satisfies equation (2), it is possible to obtain the luminance signal, and the color difference signals R-Y and B-Y. Color television signals are then obtained by passing these signals through a color encoder. Thus, the outputs of the image pick-up device are W, Ye and Cy signals, thereby making it possible to improve the utilization factor of light and the sensitivity. Moreover, since the luminance signal and the color difference signals are obtained in the above manner instead of a manner whereby the W, Ye and Cy signals are converted into R, G and B signals, it is not necessary to use a fine adjusting circuit, thus simplifying the circuit construction, improving signal-to-noise ratio and light quantity balance.

According to this invention described above, it is possible to obtain high sensitivity from such image pick-up devices having a poor spectrum sensitivity characteristic in a short wavelength range (400–500 mm). In addition, a solid state image pick-up device utilizing silicon results in the efficient use of cyan light.

Figure 1:
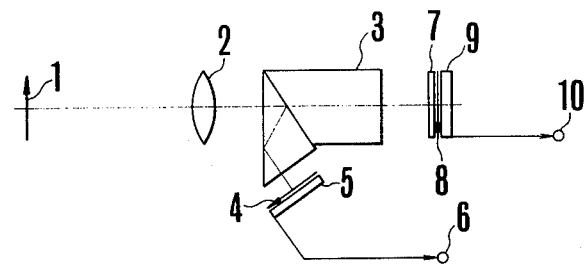
FIG. 1 is a diagrammatic representation of one example of an optical system utilized in this invention.
Figure 2:
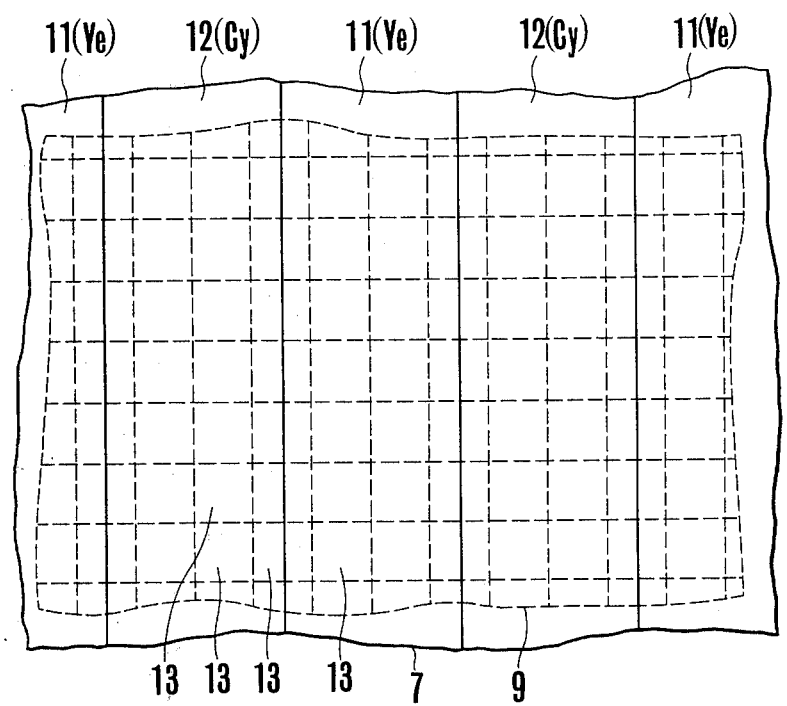
FIG. 2 is a graph showing an arrangement of color stripe filters on the color signal and an image pick-up device.

The invention will now be described with reference to the accompanying drawings. FIG. 1 shows an optical system utilized in one embodiment of the invention using the two image pick-up device types. Light reflected by an object 1 enters through a lens 2 into an analytical optical system 3 and is separated into two components. One component forms the image 4 and the other forms the image 8. The image 4 comprises a white light component which is photoelectrically converted by an image pick-up device 5 into a W signal appearing at a terminal 6. The light path to the image 4 has the spectrum characteristic of the W filter described in equation (1) above. The image 8 passes through a color filter 7 and is then photoelectrically converted by an image pick-up device 9 into a Ye signal or a Cy signal appearing at a terminal 10. The relative position of the color filter 7 with respect to the image pick-up device 9 is shown in FIG. 2 in which the color filter 7 is shown as comprising yellow light transmitting filters 11 (Ye) and cyan light transmitting filters 12 (Cy). These filters are alternately and repeatedly arranged in the horizontal scanning direction. The width of these filters is selected to be equal to the width of three picture elements of the image pick-up device 9. However, the filter's width is not necessarily limited to the width of three picture elements, but is determined by the total number of picture elements in the horizontal direction and the bandwidth of the color signals produced by the image pick-up device. One picture element of the image pick-up device 9 is designated by a reference numeral 13.

Figure 3:
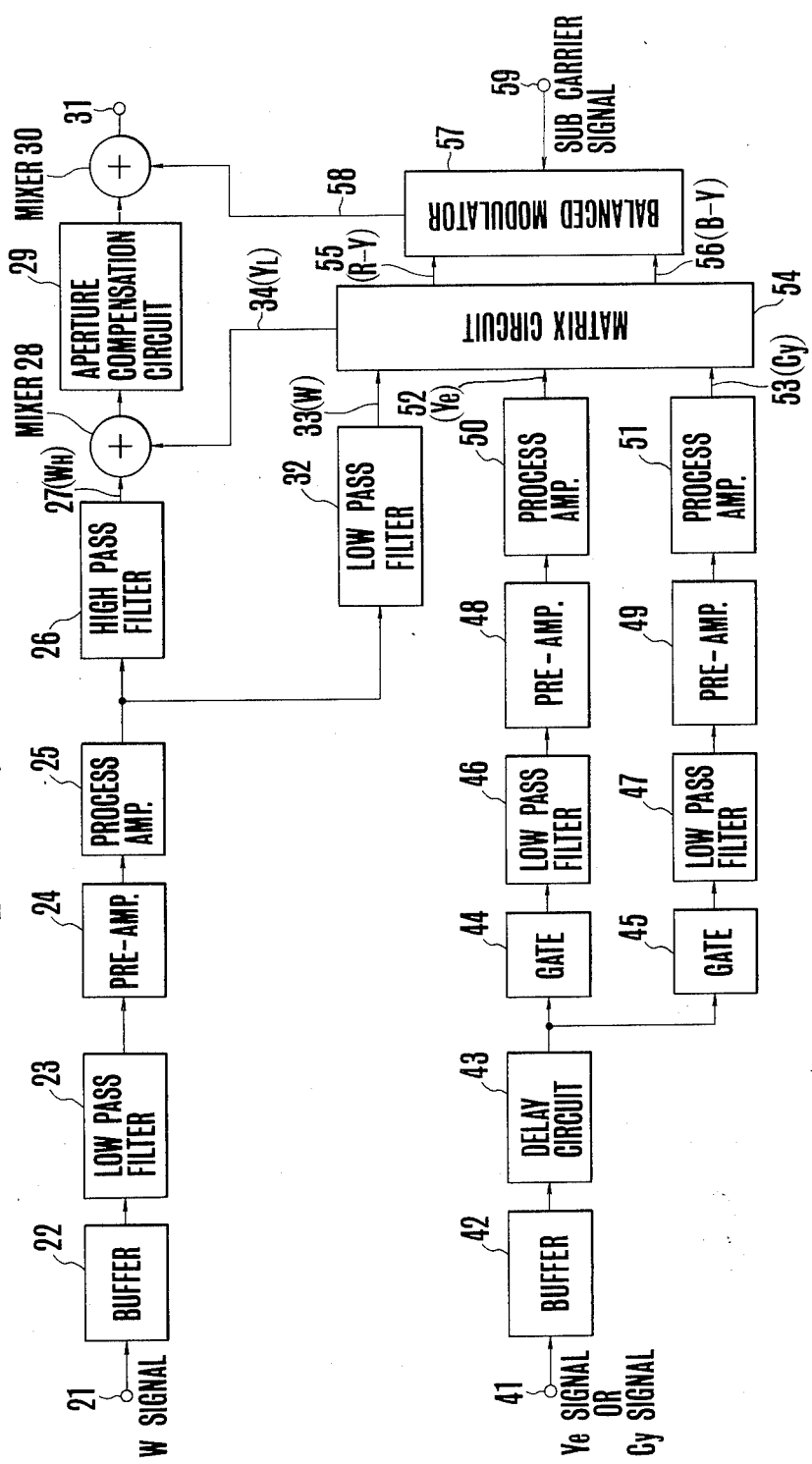
FIGS. 3 and 4 are block diagrams showing other examples of the color image pick-up apparatus embodying the invention.
Figure 4:
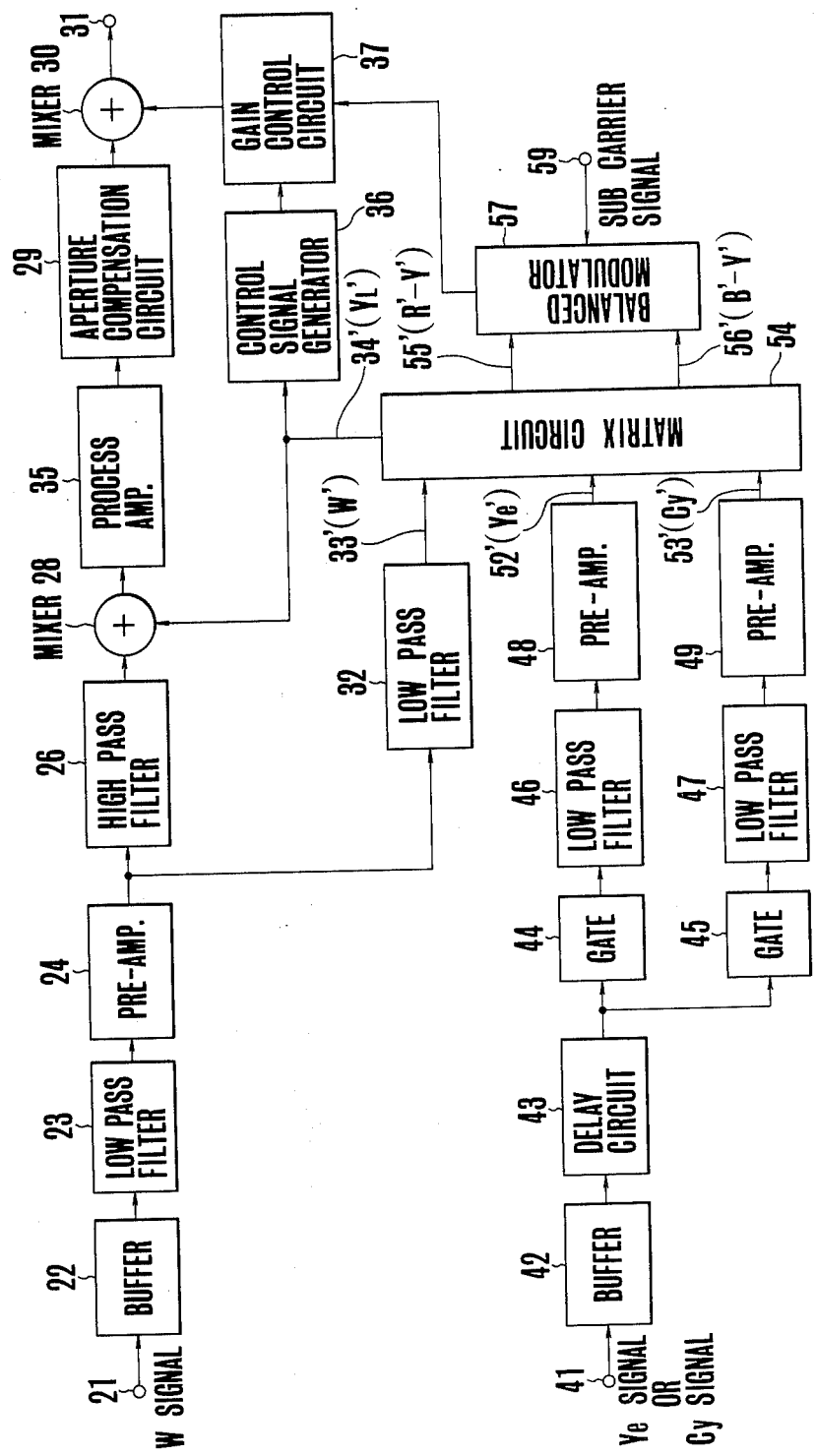

FIGS. 3 and 4 are block diagrams utilized to synthesize color television signals from signals appearing at the two output terminals 6 and 10 of the optical system shown in FIGS. 1 and 2. In FIG. 3, a signal from the output terminal 6 shown in FIG. 1 is applied to an input terminal 21, whereas a signal from the output terminal 10 shown in FIG. 1 is applied to the other input terminal 41. The signal applied to the input terminal 21 comprises a white signal (W signal) and is subjected to an impedance conversion by a buffer circuit 22, the output thereof being applied to a process amplifier 25 through a low pass filter 23 and a preamplifier 24. The low pass filter 23 has a cut-off frequency selected to be equal to the Nyquist frequency of the W signal. The preamplifier 24 amplifies the signal to a predetermined image level and includes a pre-blanking circuit and a gain control circuit (not shown). The process amplifier 25 is provided with a black clipping circuit, a white circuit and a gamma compensating circuit (not shown). Since the operations of these circuits are well known in the art, it is believed unnecessary to describe them herein.

As can be noted from FIG. 2 which shows an arrangement of color filters, the yellow signals (Ye signals) and the cyan signals (Cy signals) are alternately applied to the input terminal 41. These signals are subjected to impedance conversion in a buffer circuit 42 and then applied to a delay circuit 43 having the same delay time as the low pass filter 23. The output of the delay circuit 43 is applied to gate circuits 44 and 45, the former passing only the Ye signal component and the latter passing only the Cy signal component. The outputs of the gate circuits 44 and 45 are applied to low pass filters 46 and 47 having cut-off frequencies corresponding to the Nyquist frequencies of the signals Ye and Cy, respectively. The output of the low pass filter 46 is applied to a process amplifier 50 via a preamplifier 48. In the same manner, the output of the low pass filter 47 is applied to a process amplifier 51 via a preamplifier 49. Preamplifiers 48 and 49, and process amplifiers 50 and 51 are identical to the preamplifier 24 and the process amplifier 25 described above. The outputs of the process amplifiers 50 and 51, being the Ye signal 52 and the Cy signal 53, respectively, are applied to a matrix circuit 54. The output of the process amplifier 25 is applied to the matrix circuit 54 through a low pass filter 32. The output of the process amplifier 25 produces the W signal 33 and the low pass filter 32 has the same characteristics as the low pass filters 46 and 47 described above. The matrix circuit 54 synthesizes the three signals W, Ye, and Cy into a (R-Y) signal 55, a (B-Y) signal 56, and a luminance signal $(Y_L)$ 34 in the low frequency band. The matrix circuit 54 performs the arithmetic operation of equation (2) above. The (R-Y) signal 55 and the (B-Y) signal 56 are subjected to balanced modulation in a balanced modulator circuit 57. The modulation is caused by a subcarrier signal from an input terminal 59. The output of the balanced modulator circuit 57 produces a chrominance signal 58 which is then sent to mixer 30. The luminance signal $(Y_L)$ 34 is applied to another mixer 28 which is also supplied with the output of the process amplifier 25 through a high pass filter 26. High pass filter 26 converts the output of the process amplifier 25 to a white signal $W_H$, or a luminance signal in the high frequency band. Thus, the output of the mixer 28 is a luminance signal having a broad bandwidth. The modulation characteristic of the high frequency band of the signal is improved by an aperture compensation circuit 29, and the output thereof is sent to the mixer 30 to be mixed with the chrominance signal 58. This forms a color television signal appearing at an output terminal 31 which acts as the output signal for the color image pick-up apparatus.

A modified circuit construction of the color image pick-up apparatus is shown in FIG. 4 which is different from that shown in FIG. 3 in that the number of the process amplifiers is reduced. In FIG. 4, circuit elements identical to those shown in FIG. 3 are designated by the same reference characters. Further, FIGS. 3 and 4 are different in the position of the gamma compensating circuit. More particularly, the positions of the process amplifiers 25, 50 and 51 respectively (shown in FIG. 3) connected to the outputs of the preamplifiers 24, 48 and 49 are displaced so that in FIG. 4, the output of the preamplifier 24, in the path of the luminance signal, is sent directly to a high pass filter 26 and to a low pass filter 32. The low pass filter 32 has the same cutoff frequency as the low pass filters 46 and 47 in the path of the color signal. The output of the low pass filter 32 is sent to the matrix circuit 54 in the form of a white signal (W') 33' which is not compensated with gamma. The outputs of the preamplifiers 48 and 49, in the paths of color signals, are sent to the matrix circuit 54 in the form of a yellow (Ye') signal and a cyan signal (Cy') 53' which are not compensated with gamma. These three signals W', Ye', and Cy' are synthesized into a luminance signal ($Y_L'$) 34' in the low frequency band, and two color signals (R'-Y') 55' and (B'-Y') 56'. Signal ($Y_L'$) 34' is supplied to mixer 28 and control signal generator 36, whereas signals (R'-Y') 55' and (B'-Y') 56' are sent to the balanced modulator 57. The output of the mixer 28 is sent to a process amplifier 35 to act as a luminance signal in a broad frequency band. The input to the process amplifier 35 is compensated for gamma then sent to an aperture compensation circuit 29.

The output of the balanced modulator 57 is termed a chrominance signal and since it is balance-modulated with a color difference signal synthesized from a signal not compensated for gamma, it is slightly different from a normal chrominance signal. The difference being in that the amplitude of the chrominance signal produced by the balanced modulator 57 is controlled by a control signal prepared from a luminance signal of a low frequency band. Therefore, a signal can be obtained as if it were compensated for gamma as on the input side of the matrix circuit 54. More particularly, a gain control circuit 37 is provided to control the amplitude of the chrominance signal wherein the gain control circuit 37 is controlled by a signal generated by a control signal generator 36.

Generally, a gamma compensating circuit utilized in an image pick-up apparatus comprises a nonlinear amplifier circuit having a level of about 3 to 5 times that of the ordinary gain near a black level and about $\frac{1}{3}$-1/5 times near a white level. Accordingly, a variable gain control circuit is provided in which the gain of the luminance signal is larger near the black level, and smaller near the white level. The control signal of this variable gain control circuit is obtained by applying the output signal 34' of the matrix circuit 54 to the control signal generating circuit 36. This increases the gain of the gain control circuit 37 to 3 to 5 times of the reference gain of the luminance signal near the black level and to $\frac{1}{3}$-1/5 times of the reference gain near the white level. Thus, the gain of the chrominance signal produced by the balanced modulator 57 is controlled by the gain control circuit 37 corresponding to the gamma compensation. Thereof, the chrominance signal thus compensated for is mixed in the mixer 30 with the broad bandwidth luminance signal produced by the aperture compensation circuit 29 in order to produce a color television signal on the output terminal 31.

Figures 5, 6:
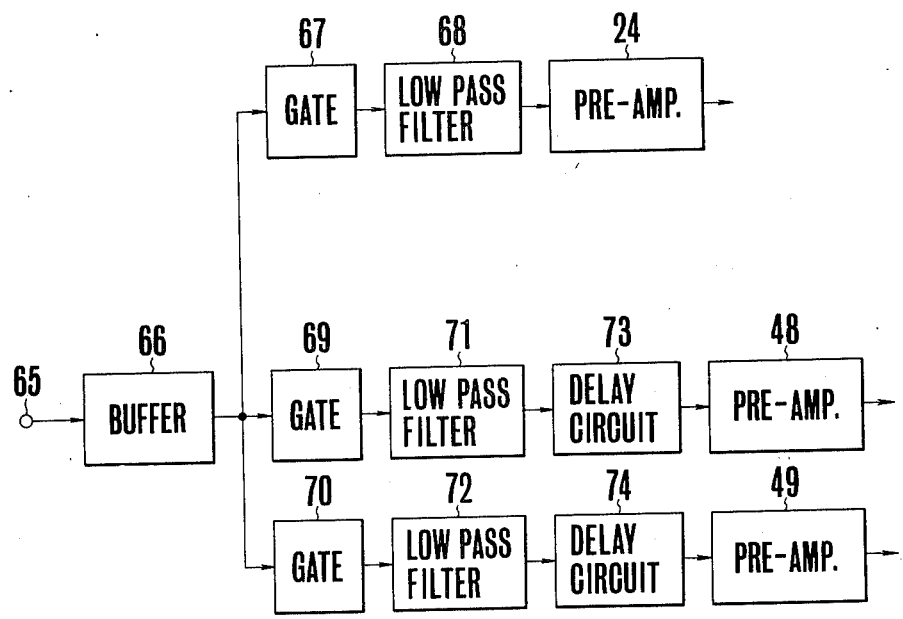
FIG. 5 shows another arrangement of color filters.
FIG. 6 is a block diagram showing a modified color image pick-up apparatus utilizing the arrangement of color filters shown in FIG. 5.

The color image pick-up apparatus shown in the foregoing embodiment comprises two image pick-up devices. FIGS. 5 and 6 show a modified embodiment comprising only one image pick-up device.

FIG. 5 shows an arrangement of transmission characteristics of the color filters disposed in front of the image pick-up device in which 61 (Ye) represents yellow color transmitting filters, 62 (W) represents filters transmitting all visible lights, and 63 (Cy) cyan represents light transmitting filters. More particularly, the all visible light transmitting filters 62 are arranged in a check pattern, and yellow light transmitting filters 61 and the cyan light transmitting filters 63 are alternately disposed about the check pattern. The respective elements of the color filters shown in FIG. 5 are arranged to correspond to respective picture elements of a solid state image pick-up device. However, to perform interlace scanning as in a standard television system, it is desirable to arrange the filters so that one of the elements of the color filters covers two picture elements which are contiguous in the vertical direction of the image pick-up device. The filters are arranged so that the output signals of both of the odd number field and even number field image pick-up devices would have a time series corresponding to the arrangement shown in FIG. 5. By arranging the color filters and the image pick-up device in a manner just described, it is possible to form a color television signal from the output signal of a single image pick-up device.

FIG. 6 illustrates a block diagram of one embodiment of the color image pick-up apparatus to accomplish this object. It should be understood that FIG. 6 shows only circuit elements different from those shown in FIG. 3. Elements corresponding to those shown in FIG. 3 are designated by the same reference numerals.

The circuit shown in FIG. 6 operates as follows. The output signal of the image pick-up device is applied to an input terminal 65 and subjected to impedance conversion in buffer 66 and is then supplied to gate circuits 67, 69 and 70. The gate circuit 67 operates to take out only a signal corresponding to the all visible-light transmitting filters W shown in FIG. 5. Gate circuit 69 operates to take out only a signal corresponding to the yellow light transmitting filters Ye shown in FIG. 5. On the other hand, the gate circuit 70 operates to take out only a signal corresponding to the cyan light transmitting filters Cy shown in FIG. 5. The output from the gate circuit 67, acting as the W signal, passes through a low pass filter 68 having a cut-off frequency equal to the Nyquist frequency and determined by the arrangement of the all-visible light transmitting filters 62 as shown in FIG. 5. The output of the low pass filter 68 is then sent to a preamplifier 24 which is identical to that shown in FIG. 3. The output of the gate circuit 69, acting as the Ye signal, passes through a low pass filter 71 having a cut-off frequency equal to the Nyquist frequency determined by the arrangement of the yellow light transmitting filters 61 as shown in FIG. 5. The output of the low pass filter 71 is then sent to a preamplifier 48 through a delay circuit 73 having the same delay time as that of the low pass filter 68. The output of the gate circuit 70, acting as the Cy signal, passes through a low pass filter 72. Because the arrangement of the Cyan light transmitting filters 63 is the same as that of the yellow light transmitting filters 61, the low pass filter 72 has the same cut-off frequency as the low pass filter 71. The output of the low pass filter 72 is then sent to a preamplifier 49 through a delay circuit 74 having the same delay time as that of the low pass filter 68. Preamplifiers 24, 48 and 49 are identical to those described in connection with FIG. 3 and since the circuit construction succeeding to preamplifiers 24, 48 and 49 shown in FIG. 6 is identical to the circuit construction succeeding to the preamplifiers 24, 28 and 49 shown in FIG. 3, it is possible to obtain television signals with a single image pick-up device.

The solid state image pick-up devices referred to hereinabove may consist of a charge-coupled device (CCD). Such devices have a metal-oxide-semiconductor structure and are well known in the solid state industry. A CCD (see FIG. 2) may consist of an array 9 of sensors 13 which are electronically activated in a particular time sequenced pattern. When used with a cyan and yellow filter array 7, the output of a CCD is a time sequenced electrical signal representing color signals whose meaning is determined by the color pattern of the filter and its relationship to the pattern in which the CCD sensors 13 are activated. The standard activation pattern is a horizontal, row-by-row sequence commencing from the top, left hand corner of the CCD array. Thus the filter-CCD arrangement depicted in FIG. 2 would produce, starting with the first complete CCD sensor element 13 depicted in the top-left hand corner therein and proceeding horizontally, a yellow-cyan picture element signal, two cyan picture element signals, a cyan-yellow picture element signal, two yellow picture element signals, and so forth.

While the invention has been described in terms of three embodiments utilizing solid state image pick-up devices, it will be clear that image pick-up tubes can also be used. Thus, the invention is not limited to the specific embodiments described above. For example, the stripe width of the color filter shown in FIG. 2 may be equal to the width of one picture element instead of the width of three picture elements. Furthermore, the arrangement of the color filters is not limited to that shown in FIG. 5 and neither are other arrangements utilizing W, Ye and Cy filters which are included in the scope of this invention. Even when the arrangement of the color filters shown in FIG. 5 is used, instead of the circuit shown in FIG. 6, it is possible to divide the circuit into two systems; one system for the white signal and the other system for color signals Ye and Cy. Once H delay line in each system is included for adding the input signal to a signal delayed by 1H. With regard to color signals, Ye signal and Cy signals are separated. This modified circuit broadens the bandwidth of the W signal to that of the horizontal picture elements. Moreover, with regard to the color signals, it is possible to derive two picture signal components for four picture elements instead of one picture signal component for four picture elements, thus increasing the signal level. So long as a matrix circuit of the W, Ye and Cy filters embodying the principle of this invention is utilized, the object of this invention can be realized.

It is also possible to construct the matrix circuit to produce I and Q signals as color difference signals instead of the R-Y and B-Y signals.

Although the present invention has been described above in terms of presently preferred embodiments, it is to be understood that such disclosure is by way of example only and is not intended to be considered as limiting. Accordingly, it is intended that the appended claims are to be interpreted as covering all alterations and modifications as fall within the true spirit and scope of the invention.

What is claimed is:

1. A color image pick-up apparatus comprising an analytical optical system for analyzing incident light into a cyan light component, a yellow light component and a white light component covering spectrum characteristics of said cyan and yellow light components, an image pick-up device for converting said cyan, yellow and white light components into electric output signals, means for separating the output signals of said image pick-up device into a cyan signal, a yellow signal and a white signal, and a matrix circuit for synthesizing said cyan signal, said yellow signal and said white signal into a luminance signal and red and blue color difference signals.

2. A color image pick-up apparatus according to claim 1 wherein said analytical optical system comprises means for dividing the incident light into two parts, and cyan light transmitting filters and yellow light transmitting filters which are arranged to permit one of said two parts to pass therethrough.

3. A color image pick-up apparatus according to claim 1 wherein said analytical optical system comprises a plurality of filters arranged in columns and rows, said filters including all light transmitting filters, cyan light transmitting filters and yellow light transmitting filters.

4. A color image pick-up apparatus according to claim 3 wherein said all light transmitting filters are arranged alternately in columns and in rows, and said cyan and yellow light transmitting filters are arranged in the interspaces between said all light transmitting filters and are arranged alternately in columns but not in rows.

5. A color image pick-up apparatus comprising:
an analytical optical system for separating incident light into a cyan light component Cy, a yellow light component Ye and a white light component W covering the spectrum characteristics of said cyan and yellow light components;
an image pick-up device for converting said cyan, yellow and white light components into electrical output signals;
means for separating the electrical output signals of said image pick-up device into a cyan signal corresponding to the intensity of the cyan light component Cy, a yellow signal corresponding to the intensity of the yellow light component Ye and a white signal corresponding to the intensity of the white light component W; and
a matrix circuit for synthesizing said cyan signal, said yellow signal and said white signal into a luminance signal Y and a pair of color difference signals R-Y and B-Y.

6. A color image pick-up apparatus according to claim 5 wherein said analytical optical system includes:
means for dividing the incident light into two components; and
cyan light transmitting filters and yellow light transmitting filters which are arranged such that the light of one of said components will pass therethrough.

7. A color image pick-up apparatus according to claim 5 wherein said analytical optical system includes a plurality of filters arranged in a rectangular array consisting of columns and rows, said filters including all light transmitting filters, cyan light transmitting filters and yellow light transmitting filters.

8. A color image pick-up apparatus according to claim 7 wherein said all light transmitting filters are arranged alternately in columns and in rows, and said cyan and yellow light transmitting filters are arranged in the interspaces between said all light transmitting filters and are arranged alternately in columns but not in rows.

9. A color image pick-up apparatus according to claims 1 or 5 wherein said matrix circuit operates in accordance with the following equation:

$$\begin{pmatrix} Y \\ R-Y \\ B-Y \end{pmatrix} = \begin{pmatrix} \frac{0.3}{r} - \frac{0.59}{g} + \frac{0.11}{b}, & \frac{0.59}{g} - \frac{0.11}{b}, & \frac{0.3}{r} + \frac{0.59}{g} \\ \frac{0.7}{r} + \frac{0.59}{g} - \frac{0.11}{b}, & -\frac{0.59}{g} + \frac{0.11}{b}, & -\frac{0.7}{r} - \frac{0.59}{g} \\ \frac{0.3}{r} + \frac{0.59}{g} + \frac{0.89}{b}, & -\frac{0.59}{g} - \frac{0.89}{b}, & \frac{0.3}{r} - \frac{0.59}{g} \end{pmatrix} \begin{pmatrix} W \\ Ye \\ Cy \end{pmatrix}$$

\* \* \* \* \*